United States Patent
Whitlock et al.

(10) Patent No.: US 9,509,554 B1
(45) Date of Patent: *Nov. 29, 2016

(54) METHODS AND APPARATUS FOR REMEDIATION EXECUTION

(71) Applicant: Tripwire, Inc., Portland, OR (US)

(72) Inventors: David Whitlock, Portland, OR (US); Guy Gascoigne-Piggford, Portland, OR (US); Geoff Granum, Portland, OR (US); Mark Petrie, Portland, OR (US)

(73) Assignee: Tripwire, Inc., Portland, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/514,171

(22) Filed: Oct. 14, 2014

Related U.S. Application Data

(63) Continuation of application No. 13/235,182, filed on Sep. 16, 2011, now Pat. No. 8,862,941.

(51) Int. Cl.
*H04L 12/24* (2006.01)

(52) U.S. Cl.
CPC ....... *H04L 41/0631* (2013.01); *H04L 41/0816* (2013.01)

(58) Field of Classification Search
CPC .................. H04L 41/0631; H04L 41/0816
See application file for complete search history.

(56) References Cited

U.S. PATENT DOCUMENTS

| | | | |
|---|---|---|---|
| 5,761,502 A | 6/1998 | Jacobs | |
| 6,009,246 A | 12/1999 | Chandra et al. | |
| 6,385,665 B1 | 5/2002 | Canady et al. | |
| 6,564,227 B2 | 5/2003 | Sakakibara et al. | |
| 6,601,017 B1 | 7/2003 | Kennedy et al. | |
| 6,938,081 B1 | 8/2005 | Mir | |
| 7,103,874 B2 | 9/2006 | McCollum et al. | |
| 7,120,680 B1 | 10/2006 | Higgins et al. | |
| 7,243,348 B2 | 7/2007 | Good et al. | |
| 7,316,016 B2 | 1/2008 | DiFalco | |
| 7,360,099 B2 | 4/2008 | DiFalco et al. | |
| 7,496,893 B2 | 2/2009 | Mohindra et al. | |
| 7,587,754 B2 | 9/2009 | DiFalco et al. | |
| 7,620,715 B2 | 11/2009 | DiFalco et al. | |
| 7,765,460 B2 | 7/2010 | DiFalco et al. | |
| 7,822,724 B2 | 10/2010 | DiFalco et al. | |
| 8,065,712 B1 | 11/2011 | Cheng et al. | |
| 8,140,635 B2 | 3/2012 | Difalco | |
| 8,176,158 B2 | 5/2012 | Difalco et al. | |
| 8,301,767 B1 | 10/2012 | Davis et al. | |
| 8,819,491 B2 | 8/2014 | Whitlock et al. | |
| 8,862,941 B2 | 10/2014 | Whitlock et al. | |
| 9,026,646 B2 | 5/2015 | Whitlock et al. | |
| 9,098,333 B1 | 8/2015 | Obrecht et al. | |
| 2002/0188711 A1 | 12/2002 | Meyer et al. | |
| 2003/0110243 A1 | 6/2003 | Soulhi | |

(Continued)

*Primary Examiner* — Michael Maskulinski
(74) *Attorney, Agent, or Firm* — Klarquist Sparkman, LLP

(57) ABSTRACT

Disclosed herein are methods, systems, and articles associated with remediation execution. In embodiments, a set of policy test failures may be selected for remediation. The set of policy test failures may be associated with a computer network with a number of nodes. For each failure within the set of policy test failures, a remediation script may be obtained to remediate a corresponding policy test failure. The remediation scripts may be selectively provided to nodes that are affected by policy test failures, for execution by the nodes. A remediation script result for each remediation script executed may be received. Based upon the remediation script results, it may be determined whether or not execution of the remediation scripts was successful.

17 Claims, 5 Drawing Sheets

(56) References Cited

U.S. PATENT DOCUMENTS

| | | |
|---|---|---|
| 2004/0078568 A1 | 4/2004 | Pham et al. |
| 2004/0153823 A1 | 8/2004 | Ansari |
| 2005/0008001 A1 | 1/2005 | Williams et al. |
| 2005/0081079 A1 | 4/2005 | Cheston et al. |
| 2005/0268326 A1 | 12/2005 | Bhargavan et al. |
| 2005/0278191 A1 | 12/2005 | DiFalco et al. |
| 2006/0095552 A1 | 5/2006 | Dini et al. |
| 2006/0224663 A1 | 10/2006 | DiFalco |
| 2006/0242277 A1 | 10/2006 | Torrence et al. |
| 2007/0005740 A1 | 1/2007 | DiFalco et al. |
| 2007/0022315 A1 | 1/2007 | Comegys |
| 2007/0022365 A1 | 1/2007 | DiFalco et al. |
| 2007/0043674 A1 | 2/2007 | DiFalco et al. |
| 2007/0043786 A1 | 2/2007 | DiFalco |
| 2007/0078701 A1 | 4/2007 | Bliznak |
| 2007/0101432 A1 | 5/2007 | Carpenter |
| 2007/0124255 A1 | 5/2007 | DiFalco et al. |
| 2007/0266138 A1 | 11/2007 | Spire et al. |
| 2007/0299943 A1 | 12/2007 | Ogle et al. |
| 2008/0040191 A1 | 2/2008 | Chakravarty et al. |
| 2008/0040455 A1 | 2/2008 | MacLeod et al. |
| 2008/0046266 A1 | 2/2008 | Gudipalley et al. |
| 2008/0148346 A1 | 6/2008 | Gill et al. |
| 2008/0228908 A1 | 9/2008 | Link et al. |
| 2008/0271025 A1 | 10/2008 | Gross et al. |
| 2009/0106597 A1 | 4/2009 | Branca et al. |
| 2009/0216605 A1 | 8/2009 | Brayton |
| 2010/0005107 A1 | 1/2010 | DiFalco |
| 2010/0024035 A1 | 1/2010 | Wallace |
| 2010/0050229 A1 | 2/2010 | Overby, Jr. |
| 2010/0198636 A1 | 8/2010 | Choudhary et al. |
| 2011/0126047 A1 | 5/2011 | Anderson et al. |
| 2011/0126099 A1 | 5/2011 | Anderson et al. |
| 2011/0126197 A1 | 5/2011 | Larsen et al. |
| 2011/0137905 A1 | 6/2011 | Good et al. |
| 2011/0138038 A1 | 6/2011 | Good et al. |
| 2011/0138039 A1 | 6/2011 | Good et al. |
| 2011/0197094 A1 | 8/2011 | Wagner |
| 2011/0197189 A1 | 8/2011 | Wagner et al. |
| 2011/0197205 A1 | 8/2011 | Wagner et al. |
| 2011/0202647 A1 | 8/2011 | Jin et al. |
| 2011/0302290 A1 | 12/2011 | Westerfeld et al. |
| 2012/0016802 A1 | 1/2012 | Zeng et al. |
| 2012/0023076 A1 | 1/2012 | Torrence et al. |
| 2012/0047239 A1 | 2/2012 | Donahue et al. |
| 2012/0117610 A1 | 5/2012 | Pandya |
| 2012/0179805 A1 | 7/2012 | DiFalco |
| 2012/0198050 A1 | 8/2012 | Maki et al. |
| 2012/0216242 A1 | 8/2012 | Uner et al. |
| 2012/0222112 A1 | 8/2012 | DiFalco et al. |
| 2012/0271937 A1 | 10/2012 | Cotton et al. |
| 2013/0014107 A1 | 1/2013 | Kirchhofer |
| 2013/0133027 A1 | 5/2013 | Chickering et al. |

METHODS AND APPARATUS FOR REMEDIATION EXECUTION

CROSS REFERENCE TO RELATED APPLICATIONS

This application is a continuation of U.S. patent application Ser. No. 13/235,182, filed Sep. 16, 2011, which is hereby incorporated herein by reference.

TECHNICAL FIELD

Embodiments relate to the technical field of data processing, in particular to methods and apparatuses compliance assessment including remediation execution.

BACKGROUND

Compliance with industry standards and/or internal company standards generally requires monitoring of rules, settings, and/or configuration parameters of computing resources. For example, one standard might mandate a minimum password length, and registry settings of a computing device may be monitored to determine whether minimum password lengths used by the computing device meet or exceed the standard. This monitoring is often initiated by a server that requests a number of client settings from a monitored computing device. Upon receiving the settings, the server may then analyze, classify, and/or store them, and issue a compliance report. Based upon the compliance report, remediation may be required at the computing device in order to bring the computing device into compliance. Often, such remediation may bring about additional services, functions and/or applications that need to be performed in response to execution of the remediation.

BRIEF DESCRIPTION OF THE DRAWINGS

Embodiments of the disclosure will be described by way of exemplary embodiments, but not limitations, illustrated in the accompanying drawings in which like references denote similar elements, and in which.

DETAILED DESCRIPTION OF ILLUSTRATIVE EMBODIMENTS

Illustrative embodiments include, but are not limited to, methods, systems, and articles associated with remediation execution. In embodiments, a set of policy test failures may be selected for remediation. The set of policy test failures may be associated with a computer network with a number of nodes. For each failure within the set of policy test failures, a remediation script may be obtained to remediate a corresponding policy test failure. The remediation scripts may be selectively provided to nodes that are affected by policy test failures, for execution by the nodes. A remediation script result for each remediation script executed may be received. Based upon the remediation script results, it may be determined whether or not execution of the remediation scripts was successful.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrase "in one embodiment" is used repeatedly. The phrase generally does not refer to the same embodiment; however, it may. The terms "comprising," "having," and "including" are synonymous, unless the context dictates otherwise. The phrase "A/B" means "A or B". The phrase "A and/or B" means "(A), (B), or (A and B)". The phrase "at least one of A, B and C" means "(A), (B), (C), (A and B), (A and C), (B and C) or (A, B and C)". The phrase "(A) B" means "(B) or (A B)", that is, A is optional.

Figure 1:
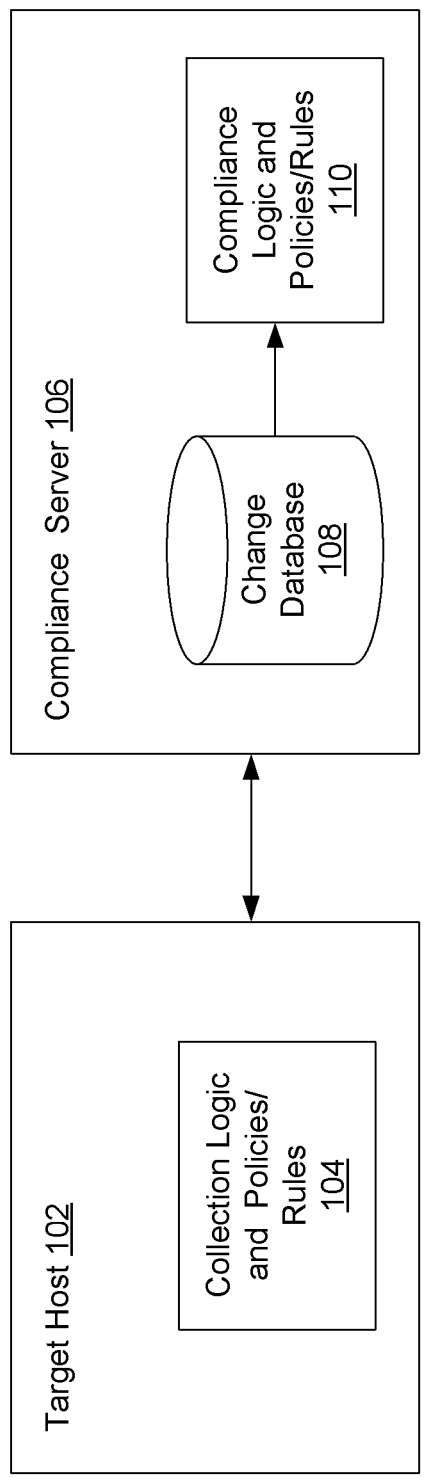
FIG. 1 illustrates a system-level view of various embodiments of the disclosure.

FIG. 1 illustrates a system-level view of various embodiments of the present disclosure. As illustrated, a target host (or node) 102 may be communicatively coupled to a compliance server 106. The compliance server 106 may be configured with compliance logic 110 to determine whether rules, settings, and/or configuration parameters of the target host 102 meet one or more compliance policies/rules 110. Hereinafter, the terms "target host" and "nodes" may be used interchangeably, and the terms are synonymous, unless the context clearly indicates otherwise.

In various embodiments, target host 102 may be configured to include collection logic and one or more collection policies or rules 104 for use in capturing changes to data of the target host 102, such as changes to rules, settings, and/or configuration parameters. The target host 102 may be configured to provide, upon detecting/capturing a change, data associated with the change to the compliance server 106. Compliance server 106 may be configured to store in a change database 108. Compliance logic 110 may be configured to generate an event notification to notify one or more event listeners of the compliance server 106 that data associated with a newly detected change has been stored in the change database 108. Compliance logic 110 may be further configured look up all compliance policies that are associated with collection policies or rules 104 that caused the collection of the received change data. The associated collection policies or rules 104 may be specified in the received change data. In some embodiments, compliance logic 110 may be further configured to filter the change data and to determine whether one or more rules, settings, and/or parameters of the change data are associated with one or more compliance policies or rules 110. The determining may include evaluating an expression of at least one of the compliance policies or rules 110 against element data in the change data. In various embodiments, compliance logic 110 may be further configured to generate test results based on whether associated compliance policies or rules 110 were determined. In one embodiment, compliance logic 110 may be further configured to generate a report of the determined association. The compliance logic 110 may be further configured to provide the report may to target host 102, a compliance entity, as will be described more fully herein, and/or an administrative user of compliance server 106, or to some other system.

Figure 5:
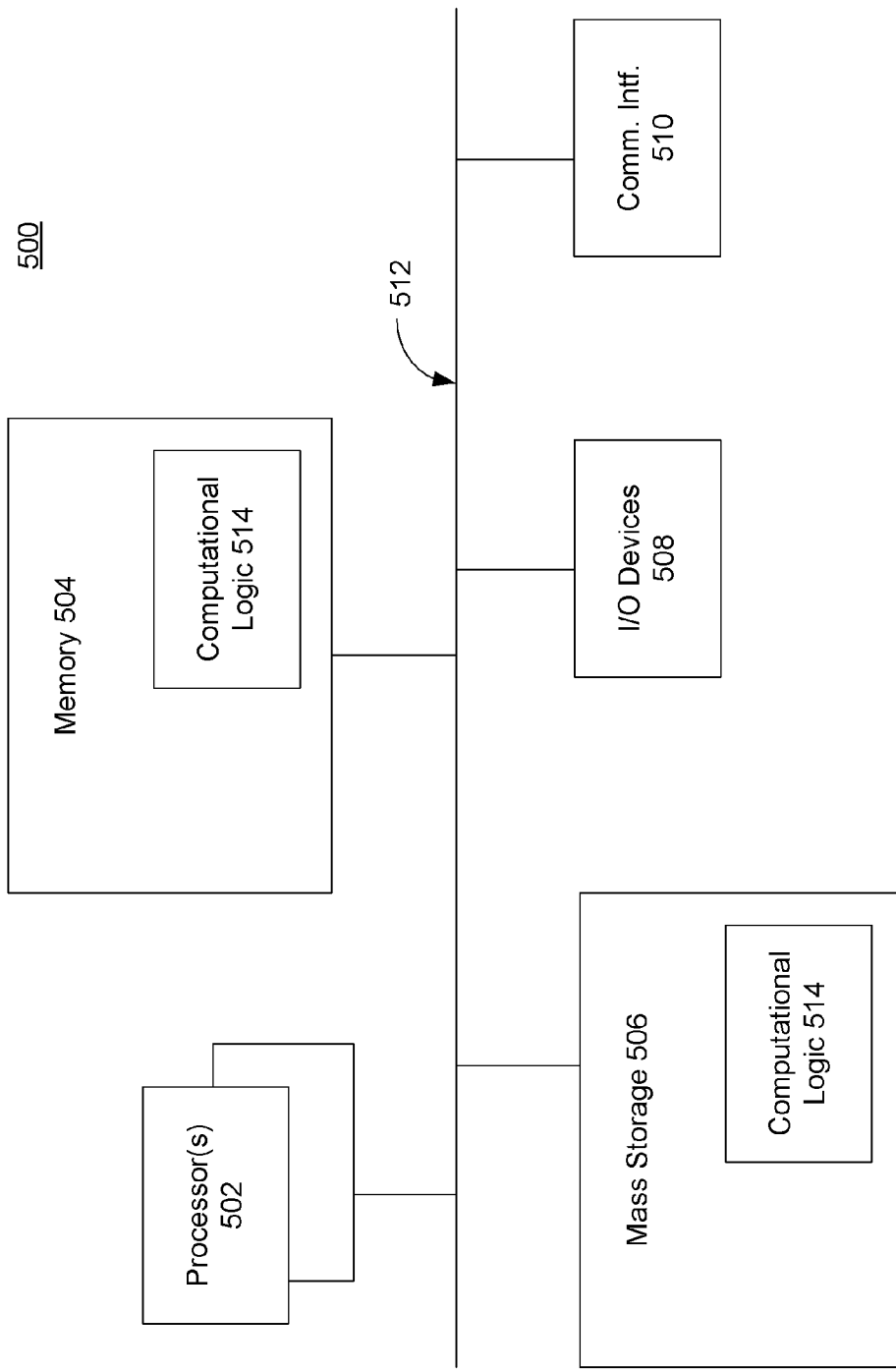
FIG. 5 illustrates an example computer system suitable for use to practice aspects of various embodiments.

In various embodiments, target host 102 and compliance server 106 may be any sort of computing devices known in the art, except for collection logic and policies/rules 104, change database 108, and compliance logic and policies/ rules 110. In various embodiments, target host 102 may be a node of a computer network made up of a plurality of nodes, wherein each node may be a computing system or device, a peripheral device, or a function/resource of a computer system/device. The computing systems/devices may be, for example, personal computers (PC), workstations, servers, routers, mainframes, modular computers within blade servers or high-density servers, personal digital assistants (PDA), entertainment centers, set-top boxes, or mobile devices. The peripheral devices may be, for example, printers, fax machines, multi-function printers, copying machines, etc. An exemplary computing device is illustrated by FIG. 5, and will be described in greater detail herein. The target host 102 generally may include configurable elements such as various files and applications.

In some embodiments, compliance server 106 and target host 102 may be deployed in a computing network of the same organization. In other embodiments, compliance server 106 may belong to a separate organization, such as a compliance monitoring organization whose purpose is to monitor and ensure industry standards. Also, in one embodiment, target host 102 and compliance server 106 may be separate logical components or virtual machines of the same or different computing devices.

In various embodiments, as mentioned above, target host 102 may have one or more collection policies or rules 104, and compliance server 106 may have a change database 108 and one or more compliance policies or rules 110. These components and associated data and logic are also illustrated in FIG. 2 and will be described herein in greater detail herein.

In various embodiments, where target host 102 and compliance server 106 are remotely disposed from each other, they may be communicatively coupled to each other. In some embodiments, the target host 102 and compliance server 106 may be coupled by a networking fabric (not illustrated). Such a networking fabric may include one or more of a local area network (LAN), a wide area network (WAN), and the Internet, as is known in the art. In one embodiment, the networking fabric may comprise a private network or a virtual private network (VPN) that may utilize tunneling. In some embodiments, where target host 102 and compliance server 106 belong to the same organization, they may be coupled by one or more private LANs or WANs of the organization.

Figure 2:
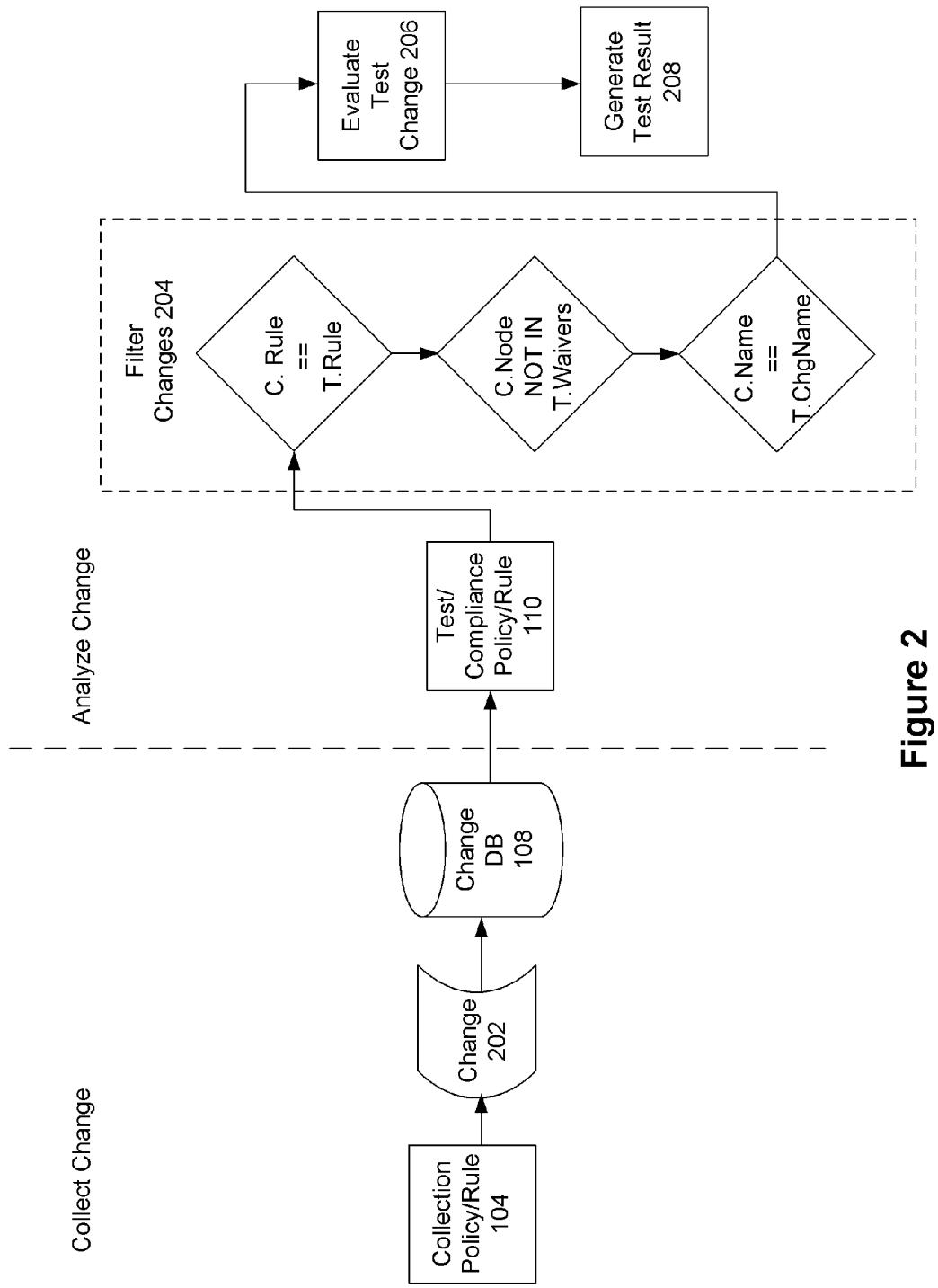
FIG. 2 illustrates an operational overview of change collection and analysis, in accordance with various embodiments.

FIG. 2 illustrates an operational overview of change collection and analysis, in accordance with various embodiments. The change and collection analysis may generally be performed for configurable elements within the target host 102. In various embodiments, collecting change data 202 may be accomplished by collection logic 110 of the target host 102, applying collection policies or rules to capture/ detect changes to the configurable elements on the target host. In some embodiments, collection policies/rules 104 may define a period at which a snapshot of the target host 102 is to be taken. In such embodiments, the period may be constant (such as every minute) or variable (such as increased or decreased frequency based on target host 102 usage). Also, the snapshot taken may be of all rules, settings, and configuration parameters on target host 102, or may be limited to a subset, such as all registry settings. In other embodiments, collection policies or rules 104 may instead define rules, settings, or configuration parameters of the target host 102 to monitor. Monitoring of these rules, settings, or configuration parameters may be accomplished through collection logic 104 or other monitoring/listening mechanism known in the art. Collection policies or rules 104 may monitor all rules, settings, or configuration parameters, or only a subset. In various embodiments, collection policies or rules 104 may be specified in any manner, such as system addresses, command lines, or other text that is interpretable by target host 102. Further, collection policies or rules 104 may be stored in any sort of file, database, or structure of target host 102. In one embodiment, collection policies or rules 104 may be stored remotely, such as on compliance server 106, and periodically fetched by target host 102.

In various embodiments, the captured/detected change may be associated with other descriptive data to form change data 202. For example, the change data 202 for a given change may include an identification of the target host 102 on which the change was captured, the rule or collection policy/rile 104 responsible for the capturing of the change, a name of the data element (such as a rule, setting, or configuration parameter) for which the change was detected, and the element data of the element for which the change was detected. In one embodiment, if the change was detected for a password having a minimum password length requirement, the change data 202 may include the name of the requirement (e.g., "minPwdLength") and the requirement, i.e., minimum password length (e.g., 10 characters).

In some embodiments, the collection policies/rules 104 and the logic 104 for applying them may be used to monitor a remote host. In such embodiments, the collection policies 104 and logic 104 may be located on e.g., compliance server 106, or another device, and may be used to remotely detect changes on a target host 102.

In various embodiments, upon being generated, change data 202 may be sent to compliance server 106, and stored in change database 108. In other embodiments, change database 108 may reside on a different computing device then compliance server 106. For example, change database 108 may reside on a database server device that is communicatively coupled to compliance server 106. Further, in various embodiments, change database 108 may be any sort of database known in the art, such as a relational database, a normalized or de-normalized database, a data structure, or an unformatted file. In some embodiments, change database 108 may store all change data 202 received from target hosts 102. In other embodiments, change database 108 may have a data retention policy and may discard change data 202 after a specified/pre-determined duration of time.

As mentioned previously, in various embodiments, upon having new change data 202 stored in change database 108, an event notification may be generated to notify compliance logic 110 of compliance server 106 of the arrival of the change data 202. Such compliance logic 110 may include one or more event listeners configured to detect events as they are generated. Upon detecting an event, the compliance logic 110 of compliance server 106 may look up compliance policies/rules 110 associated with the received change data 202. In various embodiments, the associated compliance/policies/rules 110 may be specified in the change data 202 by collection logic 104. For example, if a collection logic 104 specified monitoring of a minimum password length, a compliance policy 110 specifying a minimum password length standard may be determined to be associated. Also, in some embodiments, compliance policies 110 may include elements specifying collection policies 104 to which they may apply. In such embodiments, determining association may simply comprise comparing compliance policies 110 to collection policies 104 of change data 202 to determine if the compliance policies 110 specify the collection policies 104.

In various embodiments, compliance policies 110 may each comprise a number of policy elements. For example, a compliance policy 110 may specify a rule or collection policy 104, a change name (such as, a name of the target host 102, data element for which a change was detected), one or more waivers from the compliance policy 110, and/or an expression for evaluating the change data 202. In some embodiments, the collection policy 104 may correspond to a collection policy 104 specified in change data 202 and the change name may correspond to an element name specified in change data 202. Also, the waivers may specify whether a target host 102 identified by change data 202 is exempted from the compliance policy 110. In some embodiments, the expression may include one or more conditions that are to be applied to data elements of change data 202 to determine whether the data elements are in compliance with the policy 110. In various embodiments, compliance policies 110 may be specified in any manner, such as, for example, tables, collections of tables, lists, or other data structures. Further, compliance policies 110 may be stored in any sort of file, database, or structure of compliance server 106. In one embodiment, compliance policies 110 may be stored remotely and fetched by compliance server 106.

In some embodiments, compliance server 106 may receive or retrieve new or updated compliance policies 110, periodically or as they become available. In one embodiment, such new or updated policies may be retrieved or received from a service or a compliance standards organization that defines industry standards.

In various embodiments, logic of compliance server 106 may filter 204 change data 202 after looking up associated compliance policies 106. As illustrated in FIG. 2, filtering 204 change data 202 may include performing a number of narrowing determinations to ensure that the policies 110 are only applied to the target hosts 102 and changes to which they are intended to apply. For example, a first of these filtering operations 204 has already been mentioned: comparing a rule/collection policy 104 specified in a policy element of the compliance policy 110 to a rule/collection policy 104 specified in the change data. If there is a match, further filtering operations 204 may be performed. For instance, compliance server 106 may check whether the target host 102 is listed in a waivers list element of a compliance policy 106. Then, if the target host 102 specified in the change data is not present in the waivers list, the compliance server 106 may determine whether a change name specified in the compliance policy 110 matches a data element name specified in the change data 202, such as the data element name described previously. If there is a match, the compliance server 106 may then apply the compliance policy 110 to the change data.

In some embodiments, the compliance server 106 may apply a compliance policy 110 to change data 202 to determine whether the one or more rules, settings, and/or configuration parameters specified in the change data meet one or more compliance policies 110. As previously mentioned, the rules, settings, and/or configuration parameters may be specified by the element name and element data of change data 202. And as illustrated, that determining may comprise evaluating 206 an expression specified in a compliance policy 110 against element data specified in the change data 202. For example, the expression of the compliance policy may specify that all passwords must be at least 10 characters long, and the element data of change data 202 may specify that a recently changed password length setting requires passwords to be only at least 9 characters long. Such an evaluation may then indicate that the password length setting of the target host 102 is not in compliance with compliance policy 110.

In various embodiments, the compliance server 106 may then generate 208 a test result based on the determining/evaluating 206. The test result may indicate either that the rule, setting, or configuration parameter specified in change data 202 is in compliance or not in compliance with compliance policy 110. In various embodiments, the test results may then be stored in a test results database (not illustrated). In one embodiment, the test results database may be identical to the change database. In some embodiments, the compliance server 106 may then generate a report based on the test result and may store the report or provide it to the target host 102, an administrative user through a user interface of compliance server 106, and/or some other system. The report may include an indication of whether or not a given rule, setting, or parameter is in compliance and, if not in compliance, an indication of what an appropriate value or values for a compliant rule, setting, or parameter would be. In one embodiment, the compliance server 106 may provide the report to an industry standards/compliance monitoring organization.

In some embodiments, upon receiving a report indicating that a rule, setting, or parameter is not in compliance, target host 102 may need a remedial measure to place the rule, setting, parameter or change in compliance.

Thus, in accordance with various embodiments, policy tests may be executed in order to insure that target host 102 is in compliance with various policies, rules and configuration parameters. Test results that are test failures at various target hosts 102 may be compiled into a report by either compliance server 106 or target hosts 102. A test failure indicates that a target host 102 (or more specifically, an element within a target host 102) is not in compliance with at least one policy, rule and/or configuration parameter.

Figure 3:
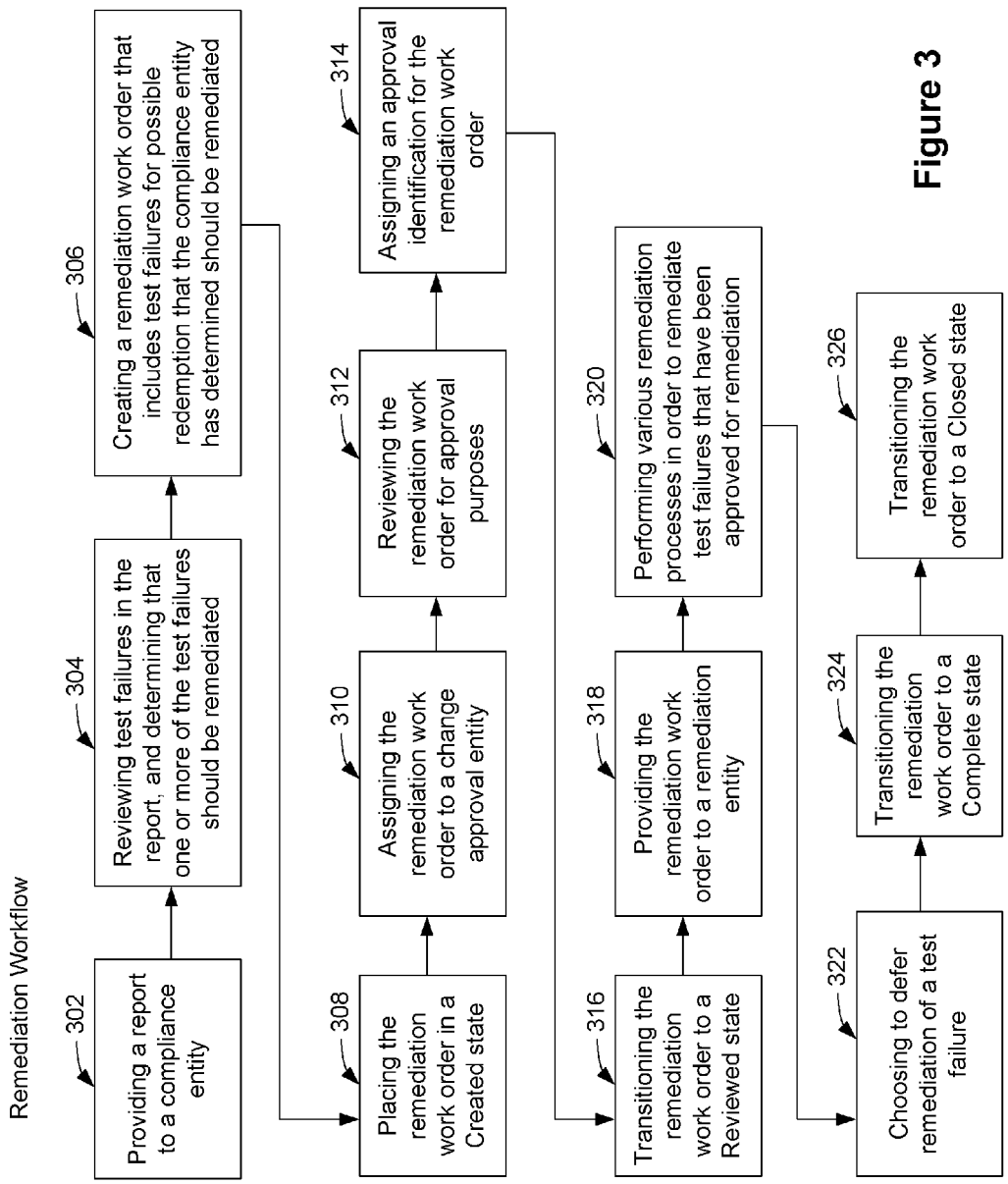
FIG. 3 illustrates an operational overview of automated remediation workflow, in accordance with various embodiments.

FIG. 3 illustrates an operational overview of a remediation workflow, in accordance with various embodiments. The workflow may start with the non-compliant report being provided, at 302, to a compliance entity, which may review, at 304, the test failures, and determine whether one or more of the test failures should be remediated. On determining one or more of the test failures should be remediated, the compliance entity may create, at 306, a remediation work order that may include test failures for possible remediation that the compliance entity has determined should be remediated. In the remediation work order, in accordance with various embodiments, the compliance entity may comment and/or provide information as to why the compliance entity believes that the test failure should be remediated. Additionally, if upon further review, the compliance entity believes that one or more test failures should not be remediated, the compliance entity may drop one or more test failures from the remediation work order that the compliance entity believes should not be remediated. Examples of reasons why one or more test failures may not be remediated include that a particular application at a target host 102 may be being upgraded or be subject to a change order. Additionally, remediation may disable the target host 102 thereby disabling one or more needed applications that may relate to security and/or business concerns. In accordance with various embodiments, the remediation work order may be automatically created and includes all of the test failures for possible remediation. In such embodiments, the compliance entity may review the remediation work order and may drop one or more test failures from the remediation work order that the compliance entity believes should not be remediated. The compliance entity may comment and/or provide information as to why the compliance entity believes that a test failure should be remediated or should be dropped from the remediation work order.

Once the compliance entity has completed the remediation work order, the remediation work order may be placed, at 308, in a "Created" state. The compliance entity may assign, at 310, the remediation work order to a change approval entity. The change approval entity may then review, at 312, the remediation work order for approval purposes.

The change approval entity may examine each test failure in the remediation work order and may approve or deny remediation for each of the test failures listed within the remediation work order. The change approval entity may comment and/or provide information as to why a particular test failure was approved for remediation or was denied for remediation.

In accordance with various embodiments, the change approval entity may assign, at 314, a "remediation approval identification (ID)" for the remediation work order. The remediation approval ID may correlate to or serve as a tracking ID in a ticketing system for remediation work orders.

Upon completion of the review by the change approval entity, the remediation work order may transition, at 316, to a "Reviewed" state. In accordance with various embodiments, the remediation work order may automatically transition to the Reviewed state once one of the test failures within the remediation work order has been approved or denied.

Once the change approval entity has completed its review of the remediation work order, the change approval entity may provide, at 318, the work order to a remediation entity. The remediation entity may perform, at 320, various remediation processes in order to remediate test failures that have been approved for remediation. In accordance with the various embodiments, the remediation processes may include execution of remediation scripts.

In accordance with the various embodiments, the remediation entity may choose, at 322, to defer remediation of a test failure until a later point in time. Examples of reasons why one or more test failures may not be remediated include that a particular application at a target host 102 may be being upgraded or be subject to a change order. Additionally, remediation may disable the target host 102 thereby disabling one or more needed applications that may relate to security and/or business concerns. Also, during maintenance of the target host 102, it may be desirable to accrue changes during a change window and perform multiple remediations together. It may also be desirable to have further consideration before performing one or more remediations. Once all test failures outlined in the remediation work order have either been denied for remediation, approved for remediation but deferred, or approved for remediation and the remediation process has been completed, the remediation work order may transition, at 324, to a "Complete" state.

In accordance with various embodiments, the compliance entity may periodically review and monitor the status of remediation work orders. Once a remediation work order is in the Complete state, the compliance entity may transition, at 326, the remediation work order to a "Closed" state. In accordance with various embodiments, the remediation entity may inform the compliance entity that a particular remediation work order has transitioned to the Complete state. Once a remediation work order has transitioned to the Closed state, it may generally stored, at 328, for historical purposes such that it may be available for review at future points in time if desired.

In accordance with various embodiments, the compliance entity may be a single individual, but may consist of more than one individual if desired. The compliance entity may also be a computing device, such as, for example, compliance server 106. The compliance logic 110 may generate work orders based upon policy test failures and may provide remediation measures. The change approval entity may generally consist of more than one individual, but may consist of only a single individual if desired. Likewise, the remediation entity may generally consist of two or more individuals, but may consist of only a single individual if desired. In accordance with various embodiments, a single individual may serve as one or more of the compliance entity, the change approval entity, and the remediation entity.

In accordance with various embodiments, a remediation script may be executed as part of a remediation process for each policy test failure. In accordance with an embodiment, remediation processes may be queued in a manner that insures that only one remediation script is run at a time on a given target host 102. Thus, if one target host 102. is running slow, other target hosts 102 won't be affected. More particularly, remediation scripts may be queued within a queue that is configured such that only one remediation script at a time per target host 102 is executed.

For ease of understanding, the described embodiments include a compliance entity, a change approval entity, and a remediation entity, which may be one or more individuals. All or part of the operations performed by the various entities may be facilitated by a computing device, such as compliance server 106. In various embodiments, all or part of the remediation workflow may be automated, with the operations performed by compliance server 106, and/or other computing systems.

In accordance with various embodiments, a set of failing policy tests that have been selected or approved for remediation may be determined. Remediation scripts for each policy test failure may be executed. Each remediation script may be executed by locating the remediation script, which may be located within the policy test or which may be located at the compliance server 106. Locating of the remediation script may include locating the command line and the operational script. The remediation script may then be sent to the target host 102 for execution. The target host 102 may execute the remediation script asynchronously. The output of the remediation script and an exit status may be captured by the target host 102 or some other appropriate control entity associated with target host 102. The remediation script results may be sent back to the compliance server 106 to determine whether or not the remediation operation succeeded or failed. In accordance with various embodiments, if the remediation script has a non-zero exit code, the remediation operation is deemed failed.

After all remediation scripts have been completed on a given target host 102, post-remediation commands may be executed, e.g., for successful remediations. Thus, a list of post-remediation categories may be gathered from policy tests. Post-remediation categories may include, for example, starting an operation, service, program, application, etc. within the target host 106, stopping an operation, service, program, application, etc. within the target host 106, re-starting an operation, service, program, application, etc. within the target host 106, or re-booting (re-starting) a node. Duplicate post-remediation categories may be coalesced in order to remove redundant post-remediation categories. For example, multiple remediated test failures may require that a certain service be re-started. Rather than having the same service re-started multiple times, the service may simply be re-started once.

More particularly, for each post-remediation action, the post-remediation command for the target host 102. on which the test failed may be located. The post-remediation command may be sent, from compliance server 106 or some other appropriate control entity associated with target host 102, to the target host 102. on which remediation was run. The target host 102 may be provided with the type of post-remediation action (service start, stop/re-start) and the name of the affected service. The post-remediation command result (output and exit code) may be sent back to compliance server 106. In accordance with various embodiments, reports about the remediation run and the post-remediation actions may be generated and sent to desired recipients.

Figure 4:
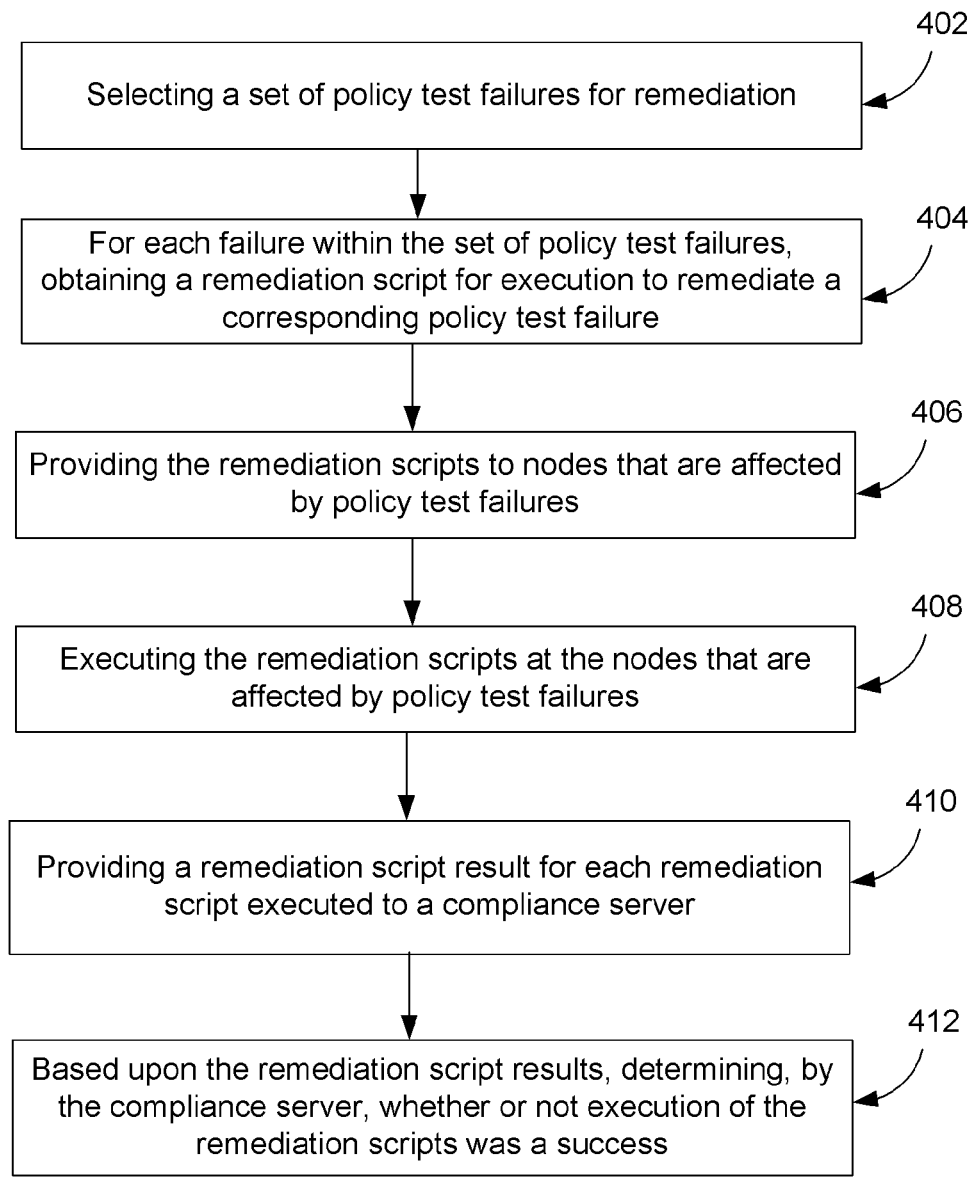
FIG. 4 illustrates a flow chart view of selected operations of the methods of various embodiments.

FIG. 4 illustrates a flow chart view of selected operations of the methods of various embodiments. As illustrated, at 402, a set of policy test failures may be selected for remediation, the set of policy test failures associated with a computer network of target hosts (or nodes). At 404, for each failure within the set of policy test failures, a remediation script may be obtained for execution to remediate a corresponding policy test failure. At 406, the remediation scripts may be provided to nodes that are affected by policy test failures. At 408, the remediation scripts may be executed at the nodes that are affected by policy test failures. At 410, a remediation script result for each remediation script executed may be provided to a compliance server. At 412, based upon the remediation script results, the compliance server may determine whether or not execution of the remediation scripts was a success.

In accordance with various embodiments, the policy tests may be augmented with remediation information. The remediation information may generally include the remediation script (i.e., the command line and the optional script). Information about operations required after remediation has been run (post-remediation categories and commands) may also be included within the remediation information provided to the policy tests. Likewise, names of nodes that are potentially affected by execution of the remediation script may also be provided within the policy test. By providing such remediation information to the policy test, the change data indicating failure of policy tests may include an indication that the failure of the policy test is due to execution of a remediation script, thereby indicating that further remediation may not be necessary. Likewise, by including information about operations required after remediation, the policy test can execute the operations required after remediation without the need for further action on the part of the compliance entity.

In accordance with various embodiments, upon execution of a remediation process for a failing test, a scan or "harvesting" of various elements and/or target hosts may be performed within the network in order to detect changes to various target hosts. Based upon information provided within the remediation information provided to the policy test, any detected changes can be correlated as having been in response to the execution of the remediation process. Such correlation can be provided to the compliance server and/or the compliance entity to thereby indicate that the changes to the target hosts are okay and thus, should not be viewed as an indication of a further policy test failure. This correlation can be provided based upon a remediation work order and/or a remediation approval ID.

More particularly, in accordance with various embodiments, in order to determine whether nodes have been affected by the remediation process, a pre-remediation state of the target hosts 102 may be harvested prior to execution of the remediation process. After execution of the remediation process, a post-remediation state of the target hosts 102 may be harvested. The pre-remediation state of the target hosts may be compared to the post-remediation state of the target hosts to detect any changes. A list may then be compiled of the target hosts whose states and/or content have changed. The changes can then be correlated with or attributed to execution of the remediation process. Such correlation may be reported to the compliance entity to thereby indicate that the changes of state and/or changes in content in the target hosts may be associated with the execution of the remediation process for the failing test. In accordance with various embodiments, the remediation approval ID of the work order associated with the failing test may be used to correlate the changes to the compliance server. By correlating the list of target hosts whose states and/or content have changed due to execution of the remediation process, the compliance entity may determine that such nodes should not be deemed to be in violation of one or more policy tests. In accordance with various embodiments, the remediation process may involve execution of a remediation script.

One or more of the operations described in the preceding paragraphs may be performed by a control entity within the target host 102 or by the compliance server 106.

FIG. 5 illustrates an example computer system suitable for use to practice aspects of various embodiments. As may be seen, computing system 500 includes a number of processors or processor cores 502, and system memory 504. For the purpose of this application, including the claims, the terms "processor" and "processor cores" may be considered synonymous, unless the context clearly requires otherwise. Additionally, computing system 500 includes mass storage devices 506 (such as diskette, hard drive, compact disc read only memory (CDROM), a disc storage device, and so forth), input/output devices 508 (such as display, keyboard, cursor control and so forth) and communication interfaces 510 (such as network interface cards, modems and so forth). The elements are coupled to each other via system bus 512, which represents one or more buses. In the case of multiple buses, they are bridged by one or more bus bridges (not illustrated).

Each of these elements performs its conventional functions known in the art. In particular, system memory 504 and mass storage 506 may be employed to store a working copy and a permanent copy of the programming instructions implementing one or more aspects of the above described teachings to practice the various embodiments, herein collectively denoted as computational logic 514. The various components may be implemented by assembler instructions supported by processor(s) 502 or high-level languages, such as, for example, C, that may be compiled into such instructions.

The permanent copy of the programming instructions may be placed into permanent storage 506 in the factory, or in the field, through, for example, a distribution medium (not illustrated), such as a compact disc (CD), or through communication interface 510 (from a distribution server (not illustrated)). That is, one or more distribution media having an implementation of the agent program may be employed to distribute the agent and program various computing devices.

The constitution of these elements 502-512 are generally known to one skilled in the art, and accordingly will not be further described.

In embodiments of the present invention, an article of manufacture (not illustrated) may be employed to implement one or more methods as disclosed herein. For example, in exemplary embodiments, an article of manufacture may comprise a no-transitory computer-readable storage medium, and a plurality of programming instructions stored on the computerreadable storage medium and configured to program one or more computing devices, in response to execution of the programming instruction, to perform operations including: selecting a set of policy test failures for remediation, the policy test failures being attributable to policy tests within a computer network comprising a plurality of nodes, and for each failure within the set of policy test failures, obtaining a remediation script for execution to remediate a corresponding policy test failure. The operations may further include providing the remediation scripts to nodes that are affected by policy test failures, for execution at the nodes that are affected by policy test failures. The operations may further include providing, to a compliance server, a remediation script result for each remediation script executed, and based upon the remediation script results, to determine, by the compliance server, whether or not execution of the remediation scripts was a success.

Although specific embodiments have been illustrated and described herein, it will be appreciated by those of ordinary skill in the art that a wide variety of alternate and/or equivalent implementations may be substituted for the specific embodiments illustrated and described, without departing from the scope of the embodiments. This application is intended to cover any adaptations or variations of the embodiments discussed herein. Therefore, it is manifestly intended that the embodiments be limited only by the claims and the equivalents thereof.

What is claimed is:

1. A method comprising:
    selecting, by a computing device, a set of policy test failures for remediation, the set of policy test failures being associated with a computer network having a plurality of nodes;
    for each failure within the set of policy test failures, obtaining, by the computing device, a remediation script corresponding to the policy test failure;
    providing, by the computing device, the remediation scripts, selectively, to the nodes that are affected by the policy test failures, for execution by the nodes;
    subsequent to execution of the remediation scripts, gathering, by the computing device, a list of post-remediation categories from policy tests;
    coalescing, by the computing device, duplicate post-remediation categories;
    based upon the list of post-remediation categories, determining, by the computing device, post-remediation functions to be performed;
    eliminating, by the computing device, redundant post-remediation functions; and
    executing or causing to be executed, by the computing device, the post-remediation functions.

2. The method of claim 1, further comprising:
    queuing, by the computing device, the remediation scripts for providing to the one or more nodes, such that only one remediation script per node is executed at a time.

3. The method of claim 1, further comprising determining whether or not execution of the remediation scripts was successful by determining whether an exit code for a particular remediation script executed at a node has a non-zero value, indicating execution of the particular remediation script at the node failed.

4. The method of claim 1, further comprising:
    receiving, by the computing device, from the nodes, a remediation script result for each remediation script executed; and
    based upon the remediation script results, determining, by the computing device, whether or not execution of the remediation scripts was successful.

5. The method of claim 1, further comprising:
    adding to the policy tests, by the computing device, information including operations required after selective execution of the remediation script at the nodes; and
    based upon the information and subsequent to the execution of the remediation scripts, executing or causing to be executed, by the computing device, one or more of the operations within the computer network.

6. The method of claim 5, wherein the information includes one or more services that need to be started subsequent to the selective execution of the remediation scripts, services that need to be stopped subsequent to the selective execution of the remediation scripts, services that need to be re-started subsequent to the selective execution of the remediation scripts, or nodes that need to be re-booted subsequent to the selective execution of the remediation scripts.

7. The method of claim 5, wherein the information further includes one or more of either an identity of each of one or more nodes within the computer network that is affected by the selective execution of the remediation scripts or the remediation scripts selectively provided to the nodes for execution, or both.

8. An article of manufacture comprising:
    a non-transitory computer-readable storage medium; and
    a plurality of programming instructions stored on the storage medium and configured to program one or more computing devices, in response to execution of the programming instructions, to perform operations including:
    selecting a set of policy test failures for remediation, the policy test failures being associated with a computer network having a plurality of nodes;
    for each failure within the set of policy test failures, obtaining a remediation script for execution by one or more nodes to remediate a corresponding policy test failure;
    providing, selectively, the remediation scripts to the nodes that are affected by the policy test failures, for execution by the nodes;

subsequent to execution of all remediation scripts, gathering, by the computing device, a list of post-remediation categories from policy tests;

coalescing, by the computing device, duplicate post-remediation categories;

based upon the list of post-remediation categories, determining, by the computing device, post-remediation functions to be performed;

eliminating, by the computing device, redundant post-remediation functions; and executing or causing to be executed, by the computing device, the post-remediation functions.

9. The article of manufacture of claim 8, wherein the operations further include:

queuing remediation scripts for providing to the one or more nodes, such that only one remediation script per node is executed at a time.

10. The article of manufacture of claim 8, wherein the operations further include determining whether or not execution of the remediation scripts was successful by determining whether an exit code for a particular execution of a remediation script at a node has a non-zero value, indicating the particular execution of the remediation script at the node failed.

11. The article of manufacture of claim 8, wherein the operations further include:

receiving, by the computing device, from the nodes, a remediation script result for each remediation script executed; and based upon the remediation script results, determining, by the computing device, whether or not execution of the remediation scripts was successful.

12. The article of manufacture of claim 8, wherein the operations further include:

based upon information within the policy tests and subsequent to executing the remediation scripts, executing one or more operations within the computer network.

13. The article of manufacture of claim 12, wherein the information includes one or more services that need to be started subsequent to the selective execution of the remediation scripts, services that need to be stopped subsequent to the selective execution of the remediation scripts, services that need to be re-started subsequent to the selective execution of the remediation scripts or nodes that need to be re-booted subsequent to the selective execution of the remediation scripts.

14. The article of manufacture of claim 12, wherein the information further includes either an identity of each of one or more nodes within the computer network that is affected by execution of the remediation scripts, or one or more of the remediation scripts for execution by the nodes, or both.

15. An apparatus comprising:
one or more processors; and
a non-transitory computer-readable storage medium coupled to the one or more processors, and having stored therein a plurality of programming instructions stored on the storage medium and configured to cause the apparatus, in response to execution of the programming instructions, to:

select a set of policy test failures for remediation, the policy test failures being associated with a computer network having a plurality of nodes;

for a failure within the set of policy test failures, obtain a remediation script for execution by one or more nodes to remediate a corresponding policy test failure;

provide, selectively, the remediation script to the one or more nodes that are affected by the policy test failures, for execution by the nodes;

prior to the execution of the remediation script, harvest a pre-remediation state of each of the nodes that are affected by the policy test failures; and after execution of the remediation script:
harvest a post-remediation state of each of the nodes that are affected by the policy test failures;

compare the pre-remediation state with the post-remediation state for each of the nodes that are affected by the policy test failures to detect nodes having states, content, or both states and content that have changed;

compile a list of the nodes having states, content, or both states and content that have changed;

correlate the list of the nodes with the nodes to which the remediation script was provided; and determine, based on the correlation, one or more nodes whose changes were due to the execution of the remediation script.

16. The apparatus of claim 15, wherein the programming instructions are further configured to cause the apparatus, in response to execution of the programming instructions, to:

queue remediation scripts for providing to the one or more nodes, such that only one remediation script per node is executed at a time.

17. The apparatus of claim 15, wherein the programming instructions are further configured to cause the apparatus, in response to execution of the programming instructions, to:

generate a report identifying the one or more nodes whose changes were due to execution of the remediation scripts; and determine, based on the report, that the one or more nodes whose changes were due to execution of the remediation script are not in violation of one or more policy tests as a result of at least one of the changes.

* * * * *